US011126854B1

(12) United States Patent
Olgiati et al.

(10) Patent No.: US 11,126,854 B1
(45) Date of Patent: Sep. 21, 2021

(54) EFFICIENT IDENTIFICATION OF OBJECTS IN VIDEOS USING MOTION INFORMATION

(71) Applicant: Amazon Technologies, Inc., Seattle, WA (US)

(72) Inventors: Andrea Olgiati, Gilroy, CA (US); Nitin Singhal, Seattle, WA (US); Yuri Natanzon, Seattle, WA (US); Vasant Manohar, Tamil Nadu (IN); Davide Modolo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/612,651

(22) Filed: Jun. 2, 2017

(51) Int. Cl.
*G06K 9/00* (2006.01)
*G06T 7/246* (2017.01)

(52) U.S. Cl.
CPC ..... *G06K 9/00744* (2013.01); *G06K 9/00718* (2013.01); *G06T 7/248* (2017.01); *G06T 2207/10016* (2013.01); *G06T 2207/20081* (2013.01)

(58) Field of Classification Search
CPC ........... G06K 9/00718; G06K 9/00744; G06K 9/248; G06K 2207/10016; G06K 2207/20081
See application file for complete search history.

(56) References Cited

U.S. PATENT DOCUMENTS

| 5,767,922 | A  | * | 6/1998  | Zabih    | G06K 9/00711 |
|-----------|----|---|---------|----------|--------------|
|           |    |   |         |          | 348/699      |
| 8,600,106 | B1 | * | 12/2013 | Parenteau| G06T 7/246   |
|           |    |   |         |          | 382/103      |
| 2006/0187358 | A1 | * | 8/2006 | Lienhart | H04N 21/812 |
|           |    |   |         |          | 348/661      |
| 2012/0148093 | A1 | * | 6/2012 | Sharma   | G06T 7/194   |
|           |    |   |         |          | 382/103      |
| 2012/0162416 | A1 | * | 6/2012 | Su       | H04N 7/185   |
|           |    |   |         |          | 348/143      |
| 2017/0132468 | A1 | * | 5/2017 | Mosher   | G06K 9/00718 |
| 2017/0220816 | A1 | * | 8/2017 | Matusek  | G06F 21/6245 |
| 2017/0255832 | A1 | * | 9/2017 | Jones    | G06K 9/00771 |
| 2017/0286774 | A1 | * | 10/2017| Gaidon   | G06K 9/00718 |
| 2017/0300754 | A1 | * | 10/2017| Ohm      | G06K 9/00718 |
| 2017/0334066 | A1 | * | 11/2017| Levine   | B25J 9/161   |
| 2017/0339431 | A1 | * | 11/2017| Zhang    | G06T 3/4053  |

(Continued)

*Primary Examiner* — Nay A Maung
*Assistant Examiner* — Jose M Torres
(74) *Attorney, Agent, or Firm* — Lee & Hayes, P.C.

(57) ABSTRACT

Technologies are disclosed for efficiently identifying objects in videos using deep neural networks and motion information. Using the disclosed technologies, the amount of time required to identify objects in videos can be greatly reduced. Motion information for a video, such as motion vectors, are extracted during the encoding or decoding of the video. The motion information is used to determine whether there is sufficient motion between frames of the video to warrant performing object detection on the frames. If there is insufficient movement from one frame to a subsequent frame, the subsequent frame will not be processed to identify objects contained therein. In this way, object detection will not be performed on video frames that have changed minimally as compared to a previous frame, thereby reducing the amount of time and the number of processing operations required to identify the objects in the video.

20 Claims, 8 Drawing Sheets

(56) References Cited

U.S. PATENT DOCUMENTS

2017/0371329 A1* 12/2017 Giering .............. G05B 23/0254
2018/0121732 A1* 5/2018 Kim ................... G06K 9/00718
2018/0129892 A1* 5/2018 Bahl .................. G06K 9/00979

* cited by examiner

US 11,126,854 B1

EFFICIENT IDENTIFICATION OF OBJECTS IN VIDEOS USING MOTION INFORMATION

BACKGROUND

One mechanism for identifying objects in motion videos (which might be referred to herein as a "brute-force approach") involves analyzing each frame of a video in isolation from the other frames. As one simple example, a deep neural network might be configured to detect if there is a dog in each frame of a video. The results of such an analysis will indicate the time periods in the video in which a dog appears. Using a brute-force approach such as that described above can, however, utilize a significant amount of computing resources. For instance, using a brute-force approach to analyze one hour of video at 25 frames per second ("fps") involves analyzing 90,000 frames of video. Analyzing each frame of video can take on the order of one second of graphics processing unit ("GPU") time and utilize a significant amount of power.

The disclosure made herein is presented with respect to these and other considerations.

DETAILED DESCRIPTION

Figure 1:
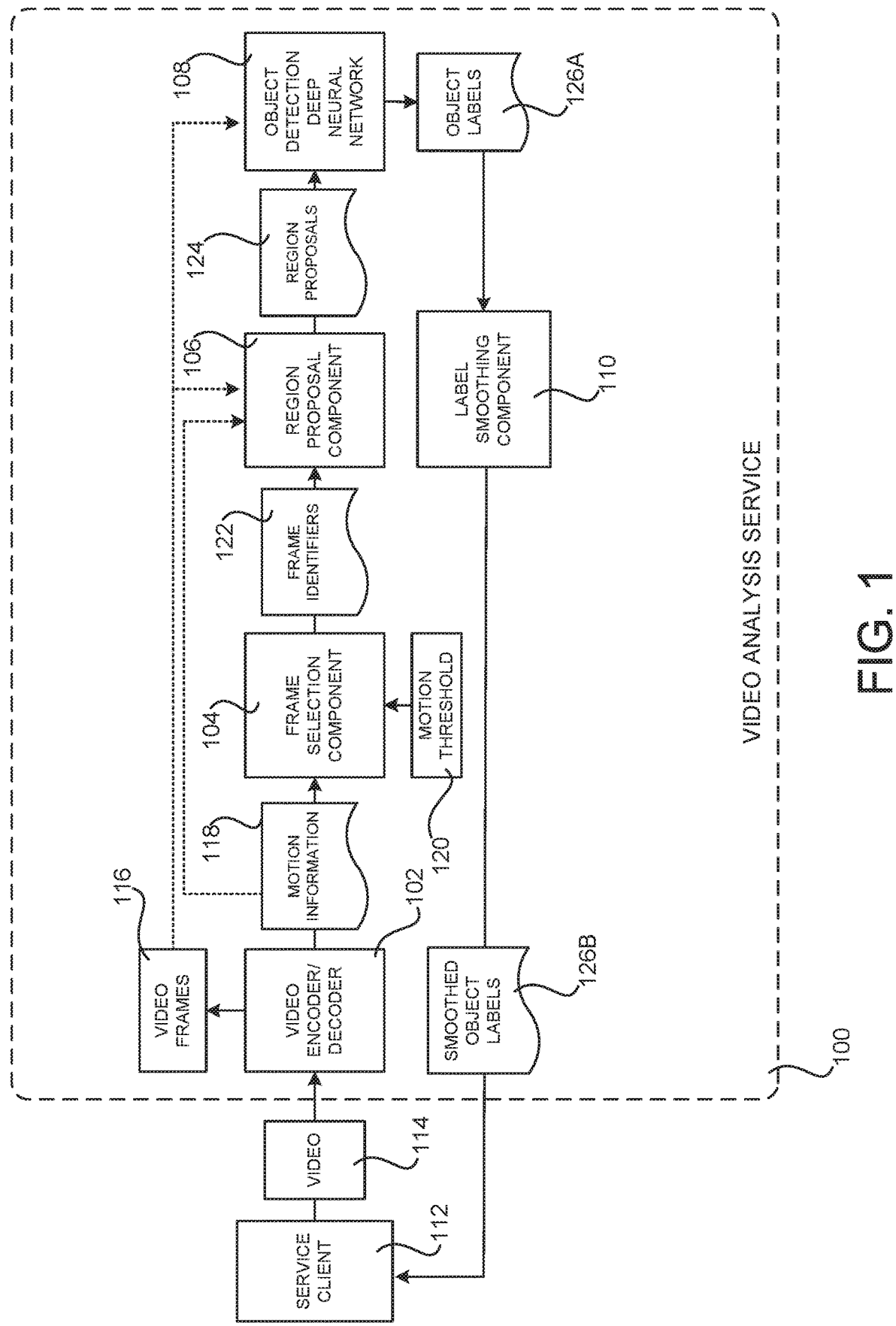
FIG. 1 is a system architecture diagram showing aspects of the configuration and operation of a video analysis service configured for efficient identification of objects in videos using motion estimation, according to one embodiment.

The following detailed description is directed to technologies for efficiently identifying objects in videos using deep neural networks and motion information. Using the disclosed technologies, the amount of time required to identify objects in videos can be greatly reduced as compared to brute-force approaches. As a result, savings can also be realized in the utilization of other types of computing resources, such as memory and mass storage. Additionally, because fewer computing resources are utilized, savings in power consumption might also be realized. The disclosed technologies can also provide additional technical benefits not specifically identified herein.

In order to enable the functionality disclosed briefly above, motion information for a video, such as data describing motion vectors or optical flow, are extracted for the video (e.g. during the encoding or decoding of the video). The motion information can be used to determine whether there is sufficient motion between frames of the video to warrant the utilization of computing resources to perform object detection on the frames. In some embodiments, the amount of motion between frames of a video must exceed a threshold value in order for object detection to be performed on the frames of the video.

If there is insufficient movement from one frame to a subsequent frame of a video, the subsequent frame of the video will not be processed to identify objects contained therein. In this way, object detection will not be performed on video frames that have changed minimally as compared to a previous frame, thereby reducing the amount of time and the number of processing operations required to identify the objects in the video.

In some embodiments, a deep neural network can be utilized to generate object labels (which might be referred to herein as "labels") for regions within the selected frames, or for the selected frames themselves, that describe the objects in the region or frame. In some embodiments, a "smoothing" operation can be performed on the object labels. In some embodiments, the motion information is used to identify semantic boundaries within videos, and the smoothing operation can be modified based upon the semantic boundaries (e.g. not smoothing the object labels across semantic boundaries). Additional details regarding the various components and processes described briefly above for efficiently identifying objects in videos using deep neural networks and motion information will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, where tasks can be performed by remote computing devices that are linked through a communications network.

In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a video analysis service 100 capable of efficient identification of objects in videos using motion estimation, according to one embodiment. As shown in FIG. 1, in one embodiment the video analysis service 100 implements a video processing pipeline that includes a video encoder/decoder 102, a frame selection component 104, a region detection component 106, an object detection deep neural network 108, and a label smoothing component 110. Each of these components will be described in greater detail below. Prior to discussing these components, however, an overview of deep learning neural networks will be provided.

Deep learning is a type of machine learning that attempts to model high-level abstractions in data by using multiple processing layers or multiple non-linear transformations. Deep learning uses representations of data, typically in vector format, where each datum corresponds to an observation with a known outcome. By processing over many observations with known outcomes, deep learning allows for a model to be developed that can be applied to a new observation for which the outcome is not known.

Some deep learning techniques are based on interpretations of information processing and communication patterns within nervous systems. One example is an artificial neural network. Artificial neural networks are a family of deep learning models based on biological neural networks. They are used to estimate functions that depend on a large number of inputs where the inputs are unknown. In a classic presentation, artificial neural networks are a system of interconnected nodes, called "neurons," that exchange messages via connections, called "synapses" between the neurons.

An example, classic artificial neural network system can be represented in at least three layers: the input layer, the hidden layer, and the output layer. Each layer contains a set of neurons. Each neuron of the input layer is connected via numerically weighted synapses to nodes of the hidden layer, and each neuron of the hidden layer is connected to the neurons of the output layer by weighted synapses. Each neuron has an associated activation function that specifies whether the neuron is activated based on the stimulation it receives from its inputs synapses. Some artificial neural network systems include multiple hidden layers between the input layer and the output layer.

An artificial neural network is trained using examples. During training, a data set of known inputs with known outputs is collected. The inputs are applied to the input layer of the network. Based on some combination of the value of the activation function for each input neuron, the sum of the weights of synapses connecting input neurons to neurons in the hidden layer, and the activation function of the neurons in the hidden layer, some neurons in the hidden layer will activate. This, in turn, will activate some of the neurons in the output layer based on the weight of synapses connecting the hidden layer neurons to the output neurons and the activation functions of the output neurons.

The activation of the output neurons is the output of the network, and this output is typically represented as a vector. Learning occurs by comparing the output extracted by the network for a given input to that input's known output. Using the difference between the output produced by the network and the expected output, the weights of synapses are modified starting from the output side of the network and working toward the input side of the network, in a process that is generally called "backpropagation."

Once the difference between the output produced by the network is sufficiently close to the expected output (defined by a cost function of the network), the network is said to be trained to solve a particular problem. While this example explains the concept of artificial neural networks using one hidden layer, many artificial neural networks include several hidden layers.

Details regarding the configuration and operation of the video processing pipeline implemented by the video analysis service 100 will now be provided. In particular, and as discussed briefly above, the video analysis service 100 includes a video encoder/decoder 102 in some embodiments. The video encoder/decoder 102 can receive a video 114 from a service client 112 and encode or decode the video 116 to generate the video frames 116 (which might be referred to herein as "frames") that comprise the video 114. For example, a suitable computing device 112 can submit a video encoded using the MP4 coded to the video encoder/decoder 102. In turn, the video encoder/decoder 102 can decode the encoded video 114 in order to extract the individual video frames 116 of the video 114.

As also illustrated in FIG. 1, the video encoder/decoder 102 also extracts motion information 118 for the video 114. The motion information 118 describes motion between frames 116 of the video 114. For example, and without limitation, in one embodiment the motion information 118 includes motion vectors extracted during the encoding of the video 114. A motion vector is data that can be used to represent a macroblock in a frame 116 based on the position of the macroblock (or a similar one) in another frame 116, which is often referred to as the "reference picture."

In another embodiment, the motion information 118 is data describing an optical flow of the video frames 116. Optical flow (which might also be referred to as "optic flow") is the distribution of the apparent velocities of objects in an image, such as one of the video frames 116. By estimating optical flow between video frames 116, the velocities of objects in the video 114 can be measured. In general, moving objects that are closer to the camera will display more apparent motion than distant objects that are moving at the same speed. Optical flow estimation is used in computer vision to characterize and quantify the motion of objects in a video stream, often for motion-based object detection and tracking systems. In this regard, it is to be appreciated that the motion information 118 can include other types of data describing motion in a video 114 in other embodiments.

In the embodiment of the pipeline shown in FIG. 1, the motion information 118 is passed to a frame selection component 104. The frame selection component 104 is a software and/or hardware component that is configured to determine, based at least on the motion information 118, whether the frames 116 of the video 112 are to be processed to determine if objects are contained therein.

In particular, the frame selection component 104 selects frames 116 of the video 114 for further processing by the pipeline shown in FIG. 1. Frames 116 that are not selected are "dropped," and are not processed further by the pipeline.

As discussed above, dropping frames 116 in this manner can result in significant savings in the utilization of computing resources.

In order to identify frames 116 that are to be dropped, the frame selection component 104 determines the amount of motion between frames 116 of the video 114. The frame selection component 104 can then make a determination as to whether to drop a frame 116 based upon the amount of motion between the frames 116. For example, and without limitation, the frame selection component 104 can select video frames 116 from the video 114 for further processing based, at least in part, upon a comparison between a threshold value 120 and an amount of motion detected between video frames 116. The motion threshold 120 can be user-specified or machine-learned in some embodiments. Other mechanisms can also be utilized to select frames 116 for further processing by the pipeline shown in FIG. 1.

Once the frame selection component 104 has selected frames 116 for further processing, the frame selection component 104 can pass frame identifiers 122 to a region proposal component 106. The frame identifiers 122 identify the frames 116 of the video 114 that have been selected for further processing.

The region proposal component 106 can generate region proposals 124 for regions in the frames 116 selected for further processing that potentially contain an object of interest. In particular, in one embodiment the region proposal component 106 identifies those portions of the frames 116 identified by the frame identifiers 122 that have changed between frames 116. The region proposal component 106 can utilize the motion information 118 to determine the portions of each frame 116 that have changed as compared to a previous frame 116. The region proposal component 106 then generates region proposals 124 that include data identifying the portions of the frames 116 that have changed (for example, the coordinates of bounding boxes for each of the frames 116). In embodiments where the region proposal component 106 is not utilized, the DNN 108, discussed below, can process the entire video frames 116 rather than just the portions that have changed.

In one embodiment, the region proposals 124 for the video frames 116 identified by the frame identifiers 122, along with the video frames 116 themselves, are passed to the object detection deep neural network 108 (which might be referred to as "the deep neural network" or the "DNN"). The DNN 108 is a deep neural network that has been trained to identify objects of interest in the regions in the video frames 116 specified by the region proposals 124 for the video frames 116 selected by the frame selection component for further processing. The output of the DNN 108 are object labels 126A identifying the objects identified in the regions 124 (as specified by the region proposals 124) of the frames 116 identified by the frame selection component 104. The object labels 126A can also identify the point in time during the video 114 that the recognized objects were present. The object labels 126A can include other types of data such as, but not limited to, data specifying the confidence level in the object recognition, such as those described above.

In one embodiment, the object labels 126A extracted by the DNN 108 are passed to a label smoothing component 110. The label smoothing component 110 is a software and/or hardware component that is configured to "smooth" the object labels 126A. Smoothing refers to a process of examining the object labels 126A for subsequent frames to ensure consistency. For instance, the object labels 126A for the first 500 frames 116 of a video 114 might indicate that a dog was recognized with high confidence. The object labels 126A for the next 500 frames 116 of the video 114 might indicate that a dog was recognized, but with very low confidence due to blur caused by camera shake or another factor. The object labels 126A for the next 500 frames might again indicate with high confidence that a dog was recognized. In this example, the label smoothing component 110 might "smooth" the object labels 126A by indicating that a dog was recognized in all 1500 frames 116 of the video 114.

In some configurations, a software and/or hardware component in the pipeline shown in FIG. 1 can identify semantic boundaries in the video 114. Semantic boundaries are present in the video 114 when the objects presented in the video 114 change rapidly. For example, a break between scenes of the video 114 can indicate a semantic boundary. In some configurations, the semantic boundaries detected in the video 114 can be utilized to influence the operation of the label smoothing component 110. For example, and without limitation, the label smoothing component 110 might be configured to avoid smoothing the object labels 126A across semantic boundaries. The semantic boundaries detected in the video 114 can be utilized to influence the operation of the label smoothing component 110 in other ways in other embodiments.

The output of the label smoothing component 110 is a collection of smoothed object labels 126B. The smoothed object labels 126B can indicate, for example, the various objects that were recognized in the video 114 and the time periods during which they were present in the video 114. The object labels 125B can include other information in other embodiments such as, but not limited to, that discussed above with regard to the object labels 126A. Additional details regarding the pipeline implemented by the video analysis service 100 will be presented below with regard to FIG. 2.

Figure 2:
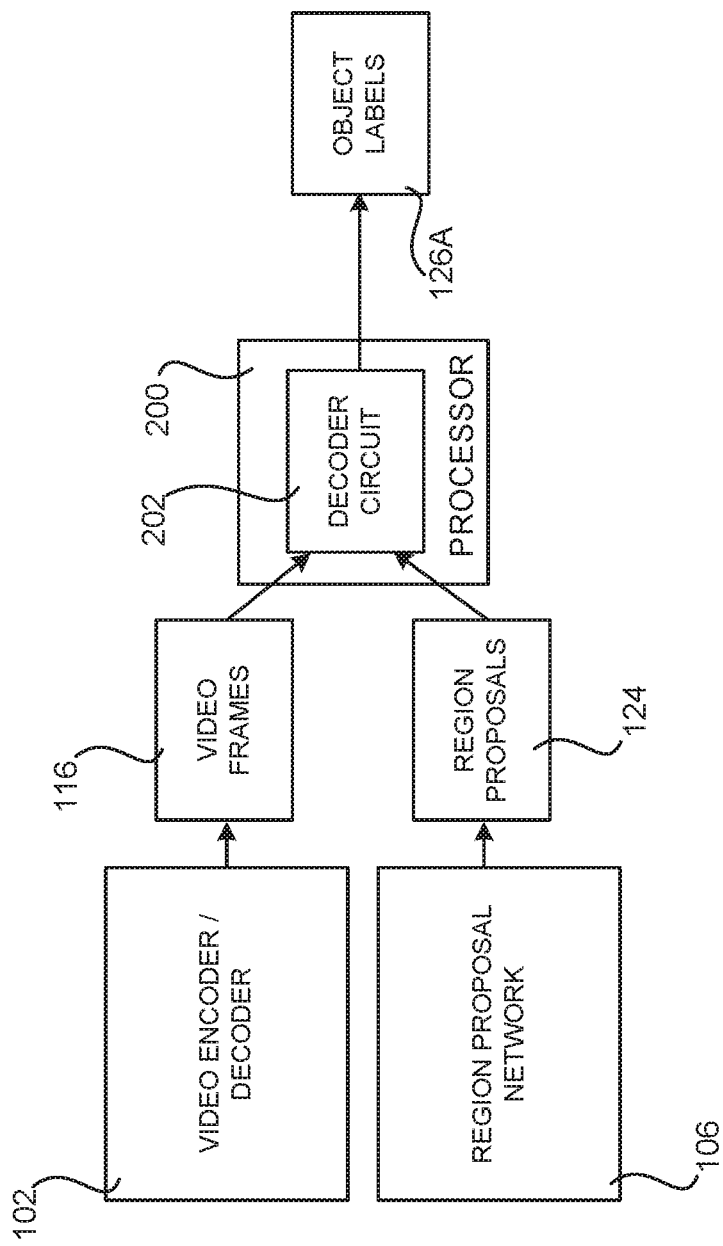
FIG. 2 is a system architecture diagram illustrating aspects of the configuration and operation of a processor configured for efficient identification of objects in videos using motion estimation, according to one embodiment.

FIG. 2 is a system architecture diagram illustrating aspects of the configuration and operation of a processor 200 that is configured for efficient identification of objects in videos 114 using motion estimation, according to one embodiment. As illustrated in FIG. 2, the processor 200 includes a decoder circuit 202 that is configured to decode instructions to select video frames 116 of a video 114 for processing based upon the amount of motion in the video frames 116, identify regions within the selected video frames 116 that are to be examined for objects of interest based upon the motion information 118, to apply a deep neural network to the identified regions in the selected video frames 116, and to generate object labels 126A identifying the objects in the regions of the selected video frames 116.

The instructions decoded by the decoder circuit can be general purpose instructions or function-specific instructions that generate the objet labels 126A using the pipeline described above. When the decoder circuit 202 is configured to decode function-specific instructions, the decoder circuit 202 can also be specific to those instructions in order to decode specific instruction fields included in x86, ARM, MIPS, or other architectures, such as an opcode, one or more data fields (immediate or addresses to data) and the like. Other processor configurations can be utilized to implement the functionality described above in other embodiments.

Figure 3:
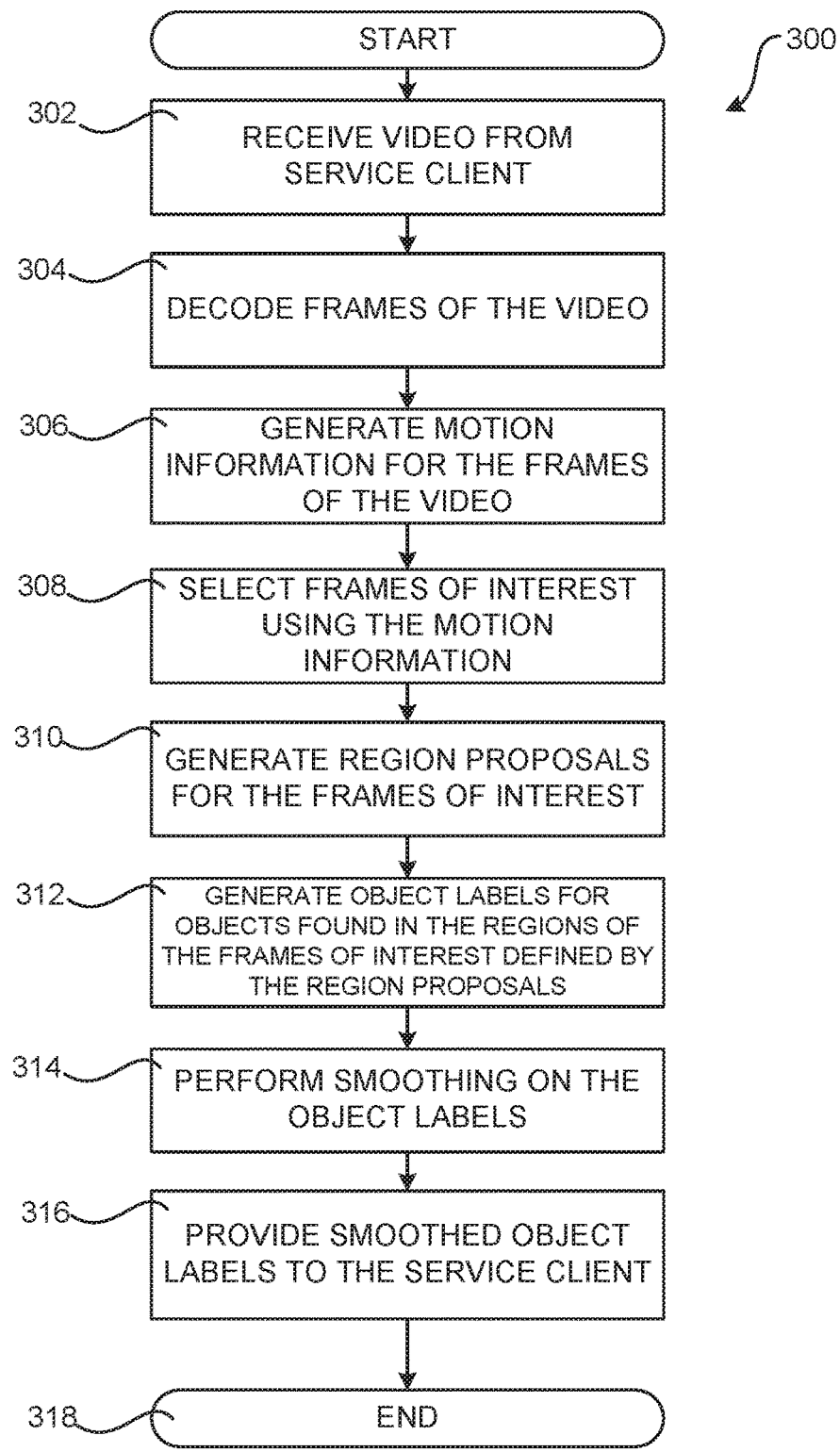
FIG. 3 is a flow diagram showing a routine that illustrates further aspects of the video analysis service of FIG. 1 for efficient identification of objects in videos using motion estimation, according to one embodiment.

FIG. 3 is a flow diagram showing a routine that illustrates further aspects of the video analysis service 100 of FIG. 1 for efficient identification of objects in videos 114 using motion estimation, according to one embodiment. It should be appreciated that the logical operations described herein with respect to FIG. 3 and the other FIGS., can be implemented (1) as a sequence of computer implemented acts or program modules running on a computing system and/or (2) as interconnected machine logic circuits or circuit modules within a processor, such as the processor 122 described above with regard to FIG. 1B.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 300 begins at operation 302, where the video analysis service 100 receives a video 114 from the service client 112. As discussed above, the video 114 can be encoded using a suitable codec, such as the MP4 codec. Other codecs can be utilized in other configurations.

From operation 302, the routine 300 proceeds to operation 304, where the video encoder/decoder 102 decodes frames 116 of the video 114. As discussed above, motion information 118, such as motion vectors or optical flow data, can be extracted during decoding of the video 114. This occurs at operation 306.

From operation 306, the routine 300 proceeds to operation 308, where the frame selection component 104 selects frames 116 for further processing by the video analysis service 100. As discussed above, the frame selection component 104 can determine the amount of motion between frames 116 of the video 114. The frame selection component 104 can then make a determination as to whether to drop a frame 116 based upon the amount of motion between the frames 116. For example, and without limitation, the frame selection component 104 can select video frames 116 from the video 114 for further processing based, at least in part, upon a comparison between a threshold value 120 and an amount of motion detected between video frames 116. Other mechanisms can be used in other embodiments.

From operation 308, the routine 300 proceeds to operation 310, where the region proposal component 106 generates region proposals 124 based upon the motion information 108. As discussed above, the region proposal component 106 can identify those portions of the frames 116 identified by the frame identifiers 122 that have changed between frames 116. The region proposal component 106 can utilize the motion information 118 to identify the portions of each frame 116 that have changed as compared to a previous frame 116. The region proposal component 106 then generates region proposals 124 that include data identifying the portions of the frames 116 that have changed (e.g. the coordinates of bounding boxes for the regions that have changed). The routine 300 then proceeds from operation 310 to operation 312.

At operation 312, the DNN 108 generates the object labels 126A for the frames 116 identified by the frame identifiers 122 in the manner described above. The DNN 108 can then pass the object labels 126A to the label smoothing component 110. The label smoothing component 110, in turn, smooths the object labels 126A in the manner described above at operation 314. The label smoothing component 110 then provides the smoothed object labels 126B to the service client 112 at operation 316. From operation 316, the routine 300 proceeds to operation 318, where it ends.

Figure 4A:
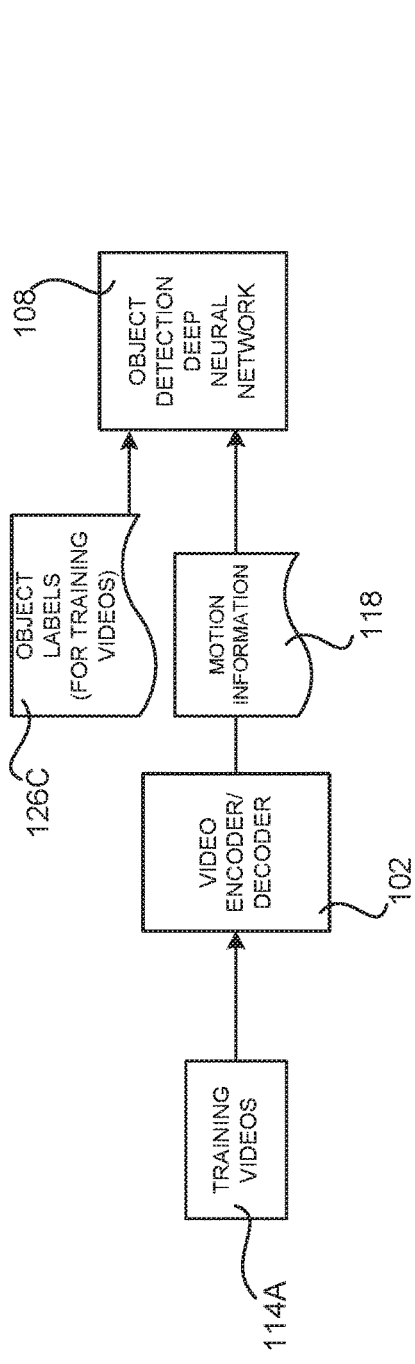
FIGS. 4A and 4B are system architecture diagrams showing aspects of a mechanism disclosed herein for efficient identification of objects in videos using deep neural networks that have been trained with data describing motion information.
Figure 4B:
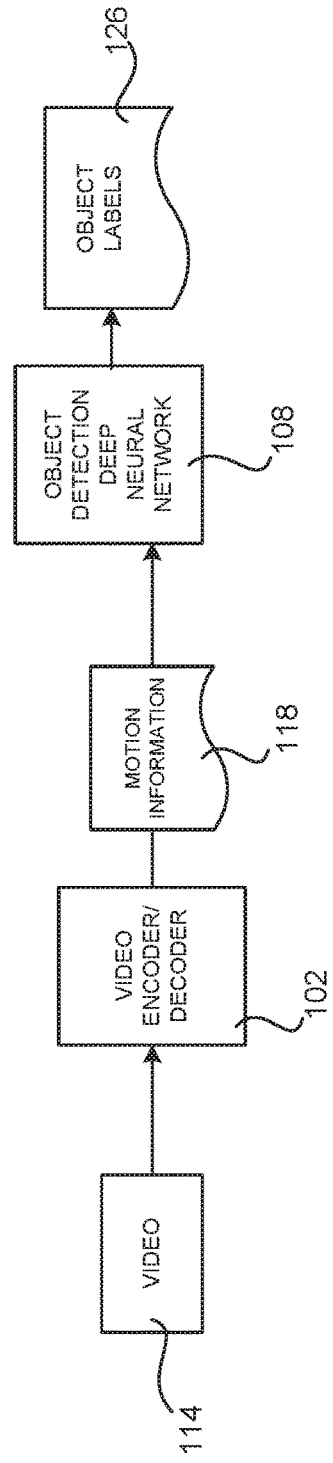

FIGS. 4A and 4B are system architecture diagrams showing aspects of a mechanism disclosed herein for efficient identification of objects in videos 114 using deep neural networks trained with motion information 118. In particular, FIG. 4A shows one mechanism for training the object DNN 108 using the motion information 118. In some embodiments, the DNN 108 is trained using still images (e.g. the frames 116) and object labels 126 that identify the objects present in the frames 116.

In the embodiment shown in FIG. 4A, however, the DNN 108 is trained using the motion information 118 that the encoder/decoder 102 has extracted for training videos 114A. The DNN 108 is also trained using annotations specifying the object labels 126C for the frames 116 of the training videos 116. In this manner, the DNN 108 can be trained to recognize objects in a video 114 based upon its motion information 118, rather than upon the content of its frames 116. This can also reduce the utilization of computing resources as compared to other solutions.

FIG. 4B shows aspects of the operation of a DNN 108 that has been trained in the manner shown in FIG. 4A for generating object labels 126 for a video 114. As shown in FIG. 4B, the video encoder/decoder 102 extracts the motion information 118 for a video 114 in the manner described above. Instead of providing the frames 116 to the DNN 108, however, the motion information 118 is provided to the DNN 108. In turn, the trained DNN 108 can predict the object labels 126 for the video 114 based upon the motion information 118. Other mechanisms can be utilized in other configuration to generate the object labels 126.

Figure 5:
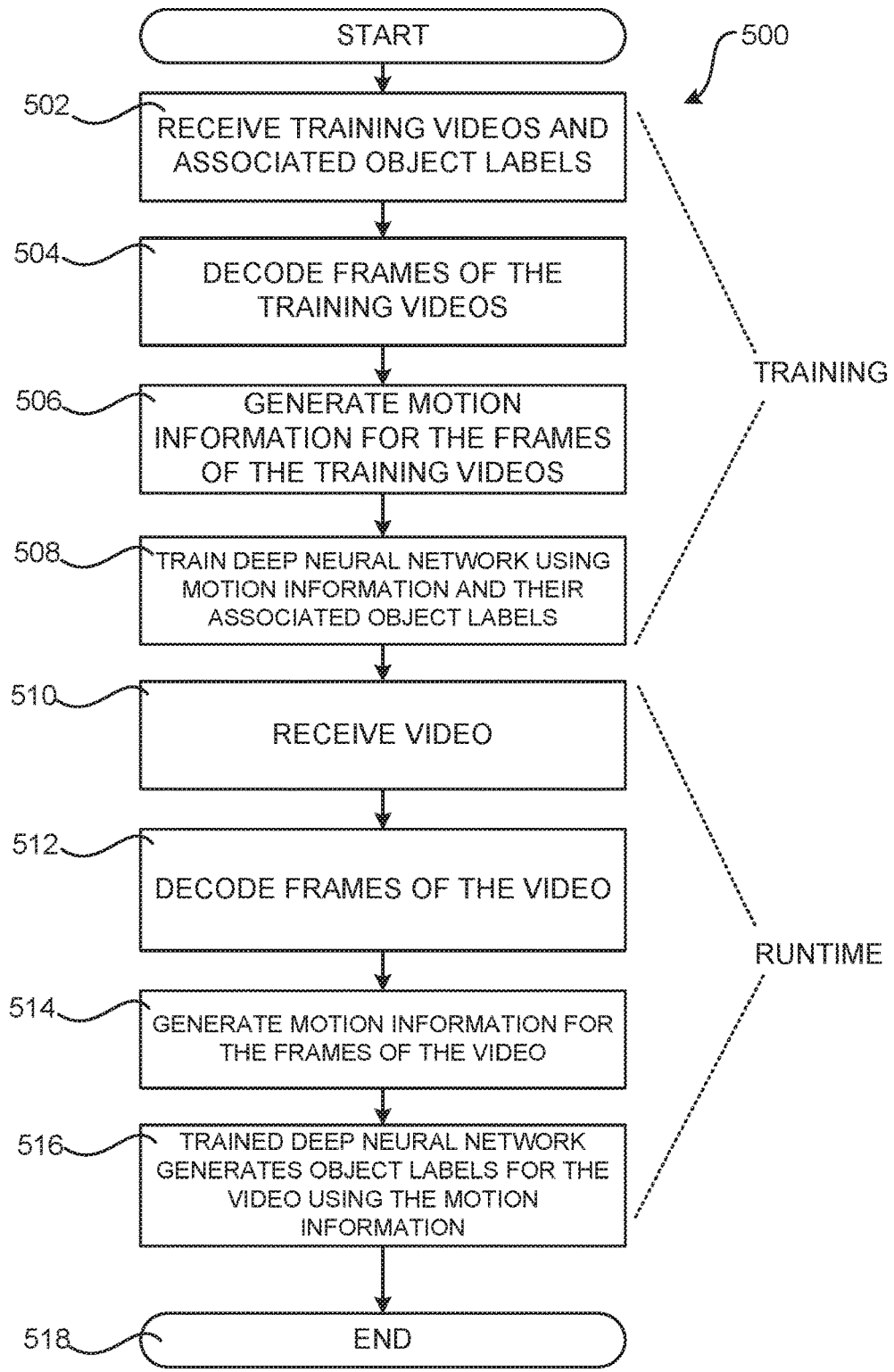
FIG. 5 is a flow diagram showing a routine that illustrates further aspects of the mechanism shown in FIGS. 4A and 4B for efficient identification of objects in videos using deep neural networks that have been trained with data describing motion information.

FIG. 5 is a flow diagram showing a routine 500 that illustrates further aspects of the mechanism shown in FIGS. 4A and 4B for efficient identification of objects in videos 114 using deep neural networks trained using the motion information 118. Operations 502-508 of the routine 500 illustrate one mechanism for training a DNN 108 using motion information 118 (as shown in FIG. 4A), while the operations 510-518 illustrate aspects of using a DNN 108 trained using motion information 118 to generate object labels 126 for a video 114 (as shown in FIG. 4B).

The routine 500 starts at operation 502, where the training videos 114A are received along with their associated object labels 126C.

From operation 502, the routine 500 proceeds to operation 504, where the frames of the training videos 114A are decoded by the video encoder/decoder 102. The routine 500 then proceeds to operation 506, where the video encoder/decoder 102 also extracts the motion information 118 for the training videos 114A.

From operation 506, the routine 500 proceeds to operation 508, where the DNN 108 is trained using the motion information 118 for the training videos 114A and object labels 126C for the training videos 114A. The object labels 126C can be manually extracted, extracted using a deep neural network, or extracted in another manner in other embodiments.

At operation 510, a video 114 is received for which object labels 126 are to be extracted. In response thereto, the video encoder/decoder 102 decodes the frames 116 of the video 114. The video encoder/decoder 102 also extracts the motion information 116 for the video at operation 514.

From operation 514, the routine 500 proceeds to operation 516, where the motion information 118 is fed to the DNN 108, which has been trained in the manner described above with regard to FIG. 4A and operations 500-508 of the routine 500. The trained DNN 108 generates the object labels 126 for the video 114 based upon the motion information 118 for the video 114. The object labels 126 can then be smoothed in the manner described above. The routine 500 then proceeds to operation 518, where it ends.

Figure 6:
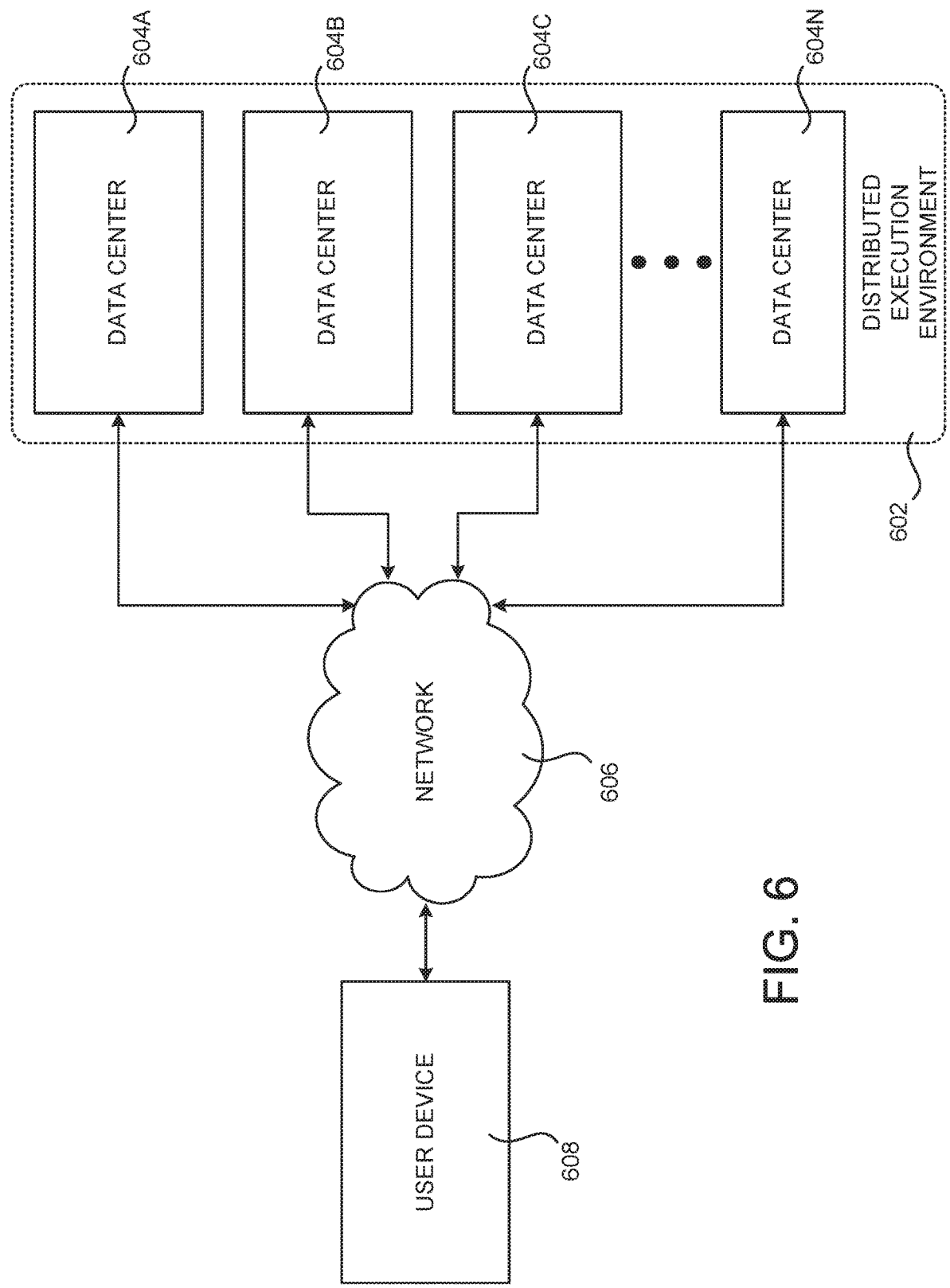
FIG. 6 is a computing system diagram that illustrates a configuration for a distributed computing network that can be utilized to implement aspects of the technologies disclosed herein.

FIG. 6 is a system and network diagram that shows aspects of a distributed execution environment 602 that can provide computing resources for implementing the various technologies disclosed herein including, but not limited to, the pipeline implemented by the video analysis service 100 described above. The computing resources provided by the distributed execution environment 602 can include various types of computing resources, such as data processing resources, data storage resources, networking resources, data communication resources, network services, and the like.

Each type of computing resource provided by the distributed execution environment 602 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services described herein, and/or other types of programs. Data storage resources can include file storage devices, block storage devices, and the like. The distributed execution environment 602 can also be configured to provide other types of resources and network services.

The computing resources provided by the distributed execution environment 602 are enabled in one implementation by one or more data centers 604A-604N (which might be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that implements some of the technologies disclosed herein will be described below with regard to FIG. 7.

Users of the distributed execution environment 602 can access the various resources provided by the distributed execution environment 602 over a network 606, which can be a wide area communication network ("WAN"), such as the Internet, an intranet or an Internet service provider ("ISP") network or a combination of such networks. For example, and without limitation, a user computing device 608 can be utilized to access the distributed execution environment 602 by way of the network 606. It should be appreciated that a local-area network ("LAN"), the Internet, or any other networking topology known in the art that connects the data centers 604 to remote computers can also be utilized. It should also be appreciated that combinations of such networks can also be utilized.

Figure 7:
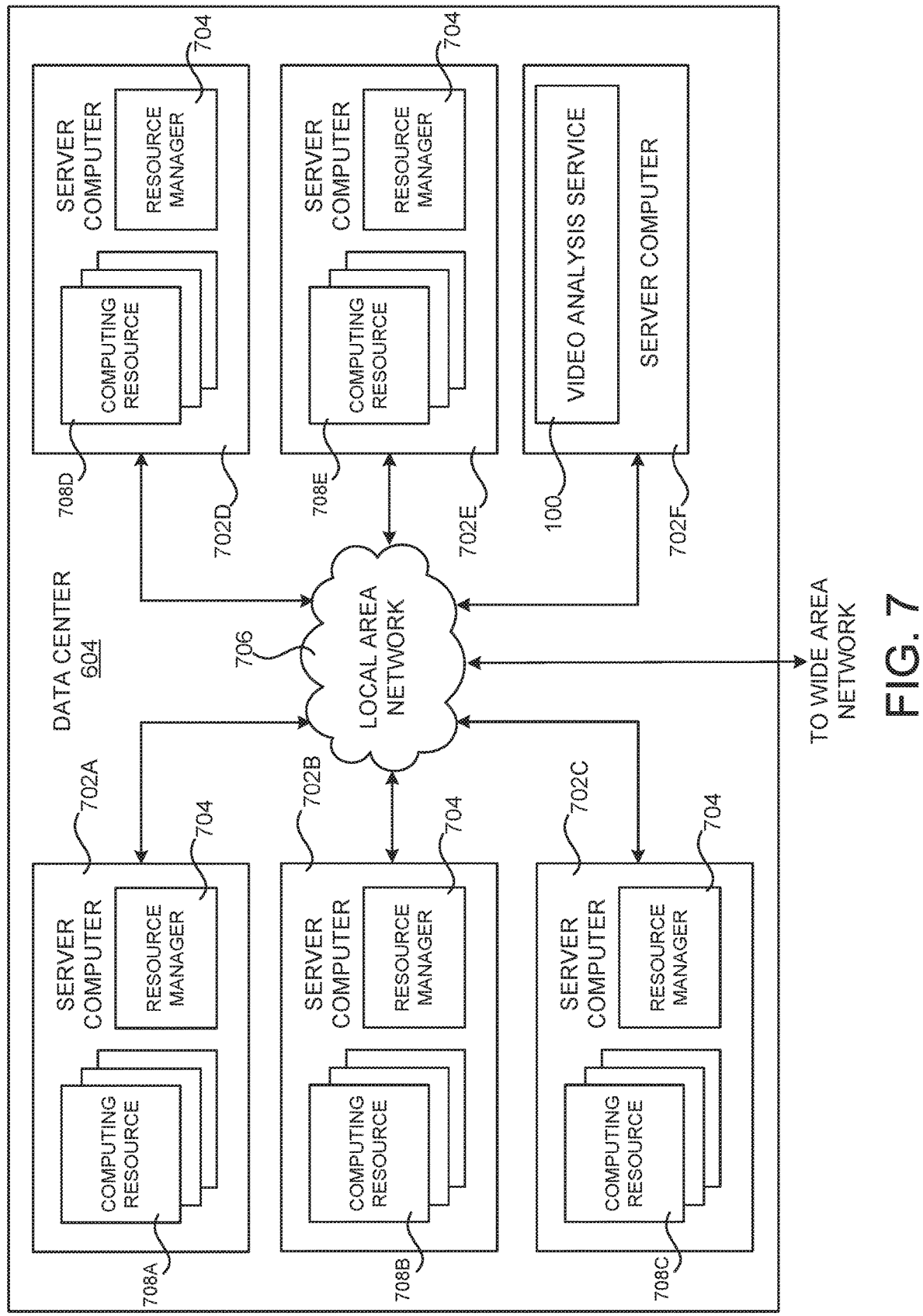
FIG. 7 is a computing system diagram that illustrates aspects of the configuration for a data center that can be utilized to implement aspects of the technologies disclosed herein.

FIG. 7 is a computing system diagram that illustrates one configuration for a data center 604 that can be utilized to implement aspects of the technologies disclosed herein. The example data center 604 shown in FIG. 7 includes several server computers 702A-702F (which might be referred to herein singularly as "a server computer 702" or in the plural as "the server computers 702") for providing computing resources 708A-708E.

The server computers 702 can be standard tower, rackmount, or blade server computers configured appropriately for providing the computing resources 708. As mentioned above, the computing resources 708 can be data processing resources such as virtual machine instances or hardware computing systems, data storage resources, database resources, networking resources, and others. Some of the servers 702 can also be configured to execute a resource manager 704 capable of instantiating and/or managing the computing resources 708. In the case of virtual machine instances, for example, the resource manager 704 can be a hypervisor or another type of program configured to enable the execution of multiple virtual machine instances on a single server 702. Server computers 702 in the data center 704 can also be configured to provide network services and other types of services for supporting provision of the components of the pipeline 100 and the related functionality described herein.

The data center 704 shown in FIG. 7 also includes a server computer 702F that can execute some or all of the software components described above. For example, and without limitation, the server computer 702F can be configured to execute software components for providing the pipeline 100. The server computer 702F can also be configured to execute other components and/or to store data for providing some or all of the functionality described herein. In this regard, it should be appreciated that the software components illustrated in FIG. 7 as executing on the server computer 702F can execute on many other physical or virtual servers in the data centers 704 in various embodiments.

In the example data center 704 shown in FIG. 7, an appropriate LAN 706 is also utilized to interconnect the server computers 702A-702F. The LAN 706 is also connected to the network 606 illustrated in FIG. 6. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 702A-702F in each data center 704 and, potentially, between computing resources 708 in each of the data centers 704. It should also be appreciated that the configuration of the data center 604 described with reference to FIG. 7 is merely illustrative and that other implementations can be utilized.

Figure 8:
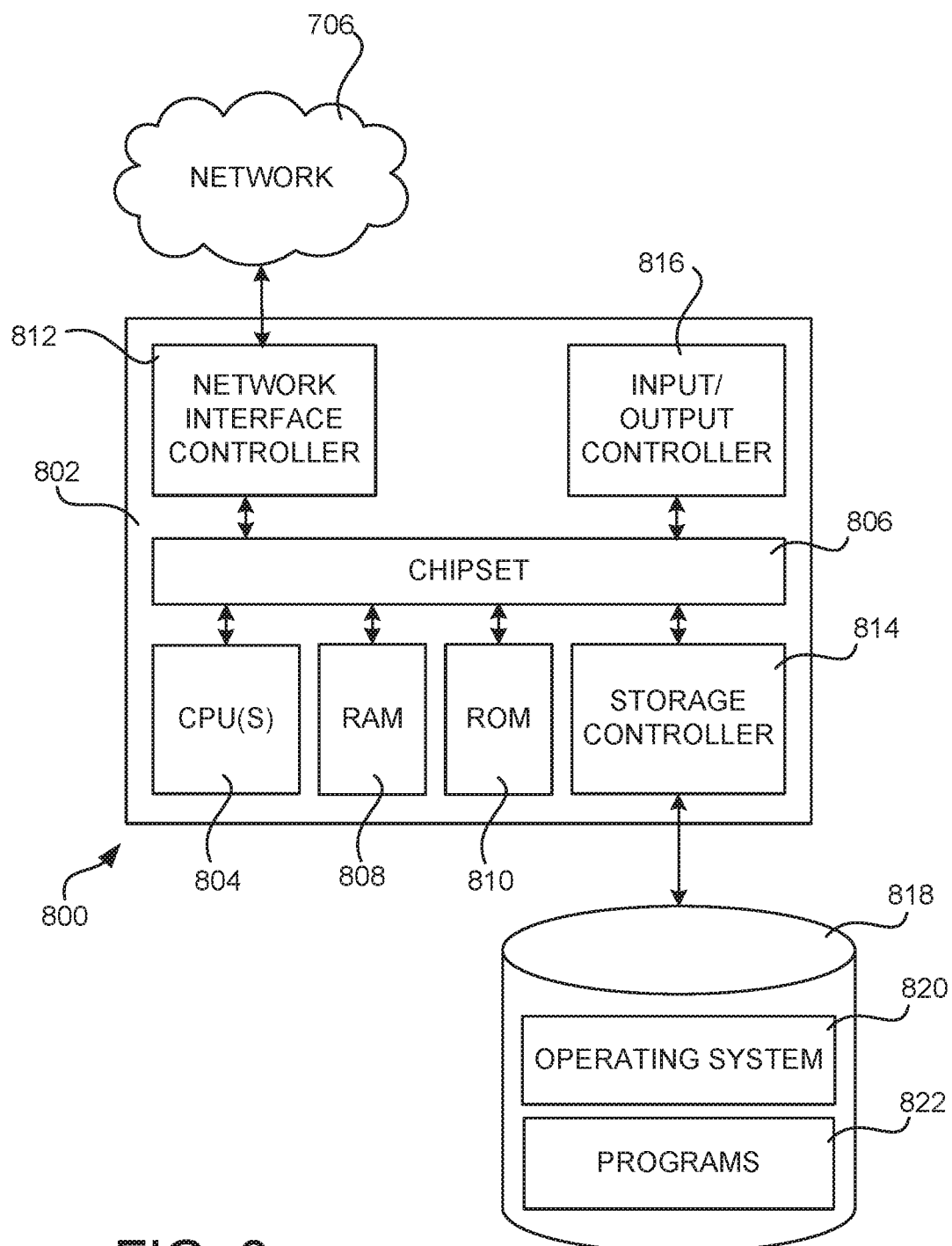
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing various aspects of the functionality described herein. The computer architecture shown in FIG. 8 illustrates a conventional server computer, workstation, desktop computer, laptop, tablet, network appliance, e-reader, smartphone, or other computing device, and can be utilized to execute any of the software components presented herein. For example, the computer architecture shown in FIG. 8 can be utilized to execute software components for providing the pipeline 100 and the related functionality described herein. The computer architecture shown in FIG. 8 can be utilized to implement the service client 112. The computer architecture shown in FIG. 8 can also be utilized to implement the user computing device 608.

The computer 800 includes a baseboard 802, or "motherboard," which is a printed circuit board to which a multitude of components or devices can be connected by way of a system bus or other electrical communication paths. In one illustrative embodiment, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the embodiments described herein.

The computer 800 can operate in a networked environment using logical connections to remote computing devices and computer systems through a network, such as the network 806. The chipset 806 can include functionality for providing network connectivity through a NIC 812, such as a gigabit Ethernet adapter. The NIC 812 is capable of connecting the computer 800 to other computing devices over the network 706. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. In one embodiment, the operating system 820 is the LINUX operating system. In another embodiment, the operating system 820 is the WINDOWS SERVER operating system from MICROSOFT Corporation. In other embodiments, the UNIX operating system or one of its variants can be utilized as the operating system 820. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800 and executed, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described herein. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

It should be appreciated that technologies have been disclosed herein for efficient identification of objects in videos using motion estimation. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. An apparatus, comprising:
    at least one non-transitory computer-readable storage medium to store instructions which, in response to being performed by one or more processors, cause the apparatus to:
    extract motion information during decoding of a video comprising a plurality of video frames, the motion information comprising at least one of motion vectors indicating motion between two or more frames of the plurality of video frames or an optical flow of the plurality of frames;
    select one or more first video frames from the plurality of video frames for processing based, at least in part, upon the motion information;
    determine one or more second video frames from the plurality of video frames to refrain from processing based, at least in part, upon the motion information;
    generate at least one object label for the one or more first video frames;
    identify one or more semantic boundaries in the plurality of video frames based at least in part on the motion information, the one or more semantic boundaries indicating a break in a scene represented by the video; and
    determine a confidence value associated with the at least one object label via a smoothing operation and based at least in part on the one or more semantic boundaries.

2. The apparatus of claim 1, the non-transitory computer-readable storage medium storing further instructions to generate region proposals for the one or more first video frames based, at least in part, on the motion information, and wherein to generate the at least one object label for the one or more first video frames is based, at least in part, on the region proposals.

3. The apparatus of claim 1, wherein the one or more first video frames are selected from the plurality of video frames based, at least in part, upon a comparison between a threshold value and an amount of motion detected between two or more of the plurality of video frames.

4. The apparatus of claim 1, the non-transitory computer-readable storage medium for storing further instructions to modify the smoothing operation based, at least in part, on the one or more semantic boundaries.

5. The apparatus of claim 1, wherein the one or more semantic boundaries are based, at least in part, on the motion information indicating an object position changing at a rate above a predetermined threshold.

6. A computer-implemented method, comprising:
    selecting, via a frame selection component, one or more first video frames from a plurality of video frames for processing based, at least in part, upon motion information associated with the plurality of video frames;
    determine one or more second video frames from the plurality of video frames to refrain from processing based, at least in part, upon the motion information;
    causing, via a processor, at least one object label to be generated for the one or more first video frames;
    identifying, via the processor, one or more semantic boundaries indicating a break in a scene represented by the plurality of video frames based, at least in part, on the motion information; and
    performing, via the processor, a smoothing operation on the at least one object label.

7. The computer-implemented method of claim 6, wherein the motion information comprises at least one of motion vectors for the plurality of video frames or data describing an optical flow of the plurality of video frames.

8. The computer-implemented method of claim 6, the method further comprising generating, via a region proposal component, region proposals for the one or more first video frames based, at least in part, on the motion information, and wherein causing the at least one object label to be generated for the one or more first video frames is based, at least in part, on the region proposals.

9. The computer-implemented method of claim 6, wherein the at least one object label is generated by a deep neural network trained using second motion information extracted from one or more training videos.

10. The computer-implemented method of claim 6, wherein the one or more first video frames are selected from the plurality of video frames based, at least in part, upon a comparison between a threshold value and an amount of motion detected between two or more of the plurality of video frames.

11. The computer-implemented method of claim 6, the method further comprising modifying, via the processor, the smoothing operation based, at least in part, on the one or more semantic boundaries.

12. The computer implemented method of claim 6, further comprising determining a confidence value associated with the at least one object label via the smoothing operation.

13. A computer-implemented method, comprising:
    selecting one or more first video frames from a plurality of video frames of a video based, at least in part, upon motion information for the video;
    determine one or more second video frames from the plurality of video frames to refrain from processing based, at least in part, upon the motion information;
    utilizing a deep neural network to identify one or more objects in the one or more first video frames of the video; and
    identifying one or more semantic boundaries indicating a break in a scene represented by the plurality of video frames based, at least in part, on the motion information indicating an object position changing at a rate equal to or greater than a predetermined threshold.

14. The computer-implemented method of claim 13, wherein the motion information comprises motion vectors for the plurality of video frames.

15. The computer-implemented method of claim 13, wherein the motion information comprises data describing an optical flow of the plurality of video frames.

16. The computer-implemented method of claim 13, further comprising
    modifying a smoothing operation performed on object labels associated with the one or more first video frames based, at least in part, on the one or more semantic boundaries.

17. The computer-implemented method of claim 16, further comprising determining a confidence of the object labels based, at least in part, on the smoothing operation.

18. The computer-implemented method of claim 16, wherein modifying the smoothing operation comprises modifying the smoothing operation such that an object label associated with the one or more semantic boundaries is not modified.

19. The computer-implemented method of claim 13, wherein the one or more first video frames are selected from the plurality of video frames based, at least in part, upon a comparison between the predetermined threshold value and an amount of motion detected between two or more of the plurality of video frames.

20. The computer implemented method of claim 13, wherein the predetermined threshold is generated by a deep neural network trained using motion information extracted from one or more training videos.

* * * * *